United States Patent [19]
Mori et al.

[11] Patent Number: 5,112,911
[45] Date of Patent: May 12, 1992

[54] MOISTURE-CROSSLINKABLE PRIMER COMPOSITION

[75] Inventors: Masahito Mori; Kohske Torii, both of Takatsuki; Hirokazu Okamoto, Sijonawate, all of Japan

[73] Assignee: Sunstar Engineering, Inc., Osaka, Japan

[21] Appl. No.: 662,499

[22] Filed: Feb. 28, 1991

Related U.S. Application Data

[63] Continuation of Ser. No. 436,712, Nov. 15, 1989, abandoned.

[30] Foreign Application Priority Data

Nov. 30, 1988 [JP] Japan ............................ 63-304786

[51] Int. Cl.$^5$ ............................................. C08F 8/00
[52] U.S. Cl. ........................................ 525/100; 525/106
[58] Field of Search ............................... 525/100, 106

[56] References Cited

U.S. PATENT DOCUMENTS

| | | | |
|---|---|---|---|
| 3,870,766 | 3/1975 | Chudha | 525/100 |
| 4,614,766 | 9/1986 | Schimmel et al. | 525/106 |
| 4,657,986 | 4/1987 | Iseyama et al. | 525/106 |
| 4,788,254 | 11/1988 | Kawakubo et al. | 525/106 |

Primary Examiner—Bernard Lipman
Attorney, Agent, or Firm—Wegner, Cantor, Mueller & Player

[57] ABSTRACT

The invention relates to a moisture-curable primer composition comprising a reaction product between a maleic anhydride-modified styrene-ethylene-butene-styrene copolymer and an epoxysilane compound. This primer composition is particularly useful for the bonding of polyolefin adherents.

3 Claims, No Drawings

MOISTURE-CROSSLINKABLE PRIMER COMPOSITION

This application is a continuation of U.S. application Ser. No. 07/436,712, filed Nov. 15, 1989, now abandoned.

BACKGROUND OF THE INVENTION

1. Field of the Invention

The present invention relates to a primer composition and more particularly to a primer composition for use in the bonding of polyolefin adherents with various adhesives.

2. Brief Description of the Prior Art

In automotive industry today, polyolefin such as ethylene-propylene-diene terpolymer (EPDM), polypropylene and polyetylene, which have various useful characteristics, are used in various applications such as car interior materials, bumpers and so on. These polyolefin are so low in polarity that in order that various materials may be securely bonded to surfaces of such adherents, the surfaces must be pretreated with some primers based on chlorinated polyolefins.

However, since chlorinated polyolefins are not crosslinkable, the adhesions lack sufficient heat resistance and durability.

OBJECT OF THE INVENTION

The object of the present invention is to provide a one-package moisture-crosslinkable primer composition for polyolefin which provides improved adhesion heat resistance and durability.

SUMMARY OF THE INVENTION

The present invention is directed to a moisture-crosslinkable primer composition comprising a reaction product obtainable by reacting a maleic anhydride-modified styrene-ethylene/butene-styrene copolymer (hereinafter referred to sometimes as modified SEBS) with an epoxysilane compound.

The moisture-crosslinkable primer composition of the present invention is produced by introducing a hydrolyzable silyl ether group into a modified SEBS copolymer having a high adhesion affinity for polyolefins.

DETAILED DESCRIPTION OF THE INVENTION

The following component materials are used in the preparation of the primer composition of the present invention.

(i) Maleic Anhydride-modified SEBS

The matrix resin in the primer composition of the invention is obtained by introducing maleic anhydride into the main chain of a styrene-ethylene/butene styrene copolymer.

As exemplary species of such resin which are commercially available, there may be mentioned Tuftec ® M-1913 and 1911 (Asahi Chemical Industry Co., Ltd.) and Kraton FG 1901 x (Shell Chemical Company).

(ii) Epoxysilane Compound

The epoxysilane compound which is to be reacted with said modified SEBS is a compound having a glycidyl group at one terminus thereof and an alkoxysilyl group at the other terminus. When such an epoxysilane compound is reacted with the above-mentioned maleic anhydride-modified SEBS, the glycidyl group of the former reacts with the maleic anhydride moiety of the latter to give an alkoxysilyl-terminated side chain. The formation of this hydrolyzable alkoxysilyl-terminated side chain gives rise to a moisture-crosslinkable primer resin.

Specific examples of such epoxysilane compound include γ-glycidoxypropyldimethylethoxysilane, γ-glycidoxypropylmethyldiethoxysilane, γ-glycidoxypropyltrimethoxysilane, β-(3,4-epoxycyclohexyl)ethyltrimethoxysilane and β-(3,4-epoxycyclohexyl)ethylmethyldimethoxysilane. These epoxysilane compounds are available from commercial sources such as Shin-Etsu Chemical Co., Ltd. Nippon Unicar Co., Ltd. and Chisso Corporation. The epoxysilane compounds can be used singly or in combination.

The polymer of the primer composition of the invention can be produced from the above-mentioned starting materials (i) and (ii), for example by the following procedures. Thus, said modified SEBS is dissolved in a solvent which may, for example, be toluene, xylene, benzene, 1,1,1-trichloroethane or methylene chloride. Then, based on the maleic anhydride in modified SEBS, approximately one-half to 2 equivalents of said epoxysilane compound is added to the above solution and the reaction is conducted at a temperature which may vary from room temperature to about 150° C. The reaction mixture thus obtained is used, either as it is or as adjusted to a nonvolatile content of 2 to 20% and a viscosity of 1 to 500 cps, as a primer composition meeting the object of the invention.

The primer composition according to the present invention is a one-package moisture-crosslinkable primer for polyolefins which is excellent in heat resistance and durability.

EXAMPLES

The following working and comparative examples are further illustrative of the present invention. In the examples, the adhesion was evaluated as follows.

EVALUATION OF ADHESION

Bonding Method

Each of the primer compositions obtained in the following examples and comparative examples was coated on a polypropylene plate (IP-407, Mitsui Petrochemical Industries, Ltd.) and dried at room temperature for 1 hour. Then, Penguin ® Cement No. 903, an adhesive manufactured by Sunstar Engineering, Inc.; 10 parts of Desmodur ®R (Bayer A.G.), a curing agent polyisocyanate, was added to 100 parts of the adhesive) was applied to both the primer-treated side of said plate and a polyvinyl chloride (PVC) sheet (Olsia MP-053, manufactured by Sunstar Engineering, Inc.). After 5 minutes' drying at room temperature, the plate and sheet were bonded and compressed with a roller under a load of 5 kg.

Evaluation Method

The 180° peeling strength was measured for 25 mm-wide testpieces at a peeling speed of 200 mm/minute.
Initial peeling strength
Measured 10 minutes after bonding
Dry peeling strength
Measured 24 hours after bonding (20° C)
Peeling strength after heat aging Measured after 24 hours of curing at 20° C and 400 hours of accelerated aging at 100° C.

Peeling strength after humidity aging

Measured after 24 hours of curing at 20° C and 400 hours of accelerated aging at 40° C and 95% R.H.

Creep at high temperature

After 24 hours of curing at 20° C, a static load of 100 g/25 mm was applied at 100° C and the peeling length was measured after 24 hours.

EXAMPLE 1

In 900 parts by weight of toluene was dissolved 100 parts by weight of Tuftec M-1913, a maleic anhydride-modified SEBS, followed by addition of 8 parts by weight of KBM303, an epoxysilane, and 1 part by weight of 1,8-diazabicyclo(5,4,0)undecane (DBU, an amine catalyst). The reaction was carried out at 110° C (reflux temperature) with stirring for 4 hours. The bonding strength data are shown in Table 1.

EXAMPLES 2 THROUGH 6

The various primer compositions shown in Table 1 were prepared in substantially the same manner as the composition of Example 1. The bonding strength test data are also shown in Table 1.

COMPARATIVE EXAMPLE 1

The test data generated using the conventional chlorinated polyolefin primer (Hardlen 15L (Toyo Soda Co., Ltd.) under the same conditions as in Example 1 are also shown in Table 1.

COMPARATIVE EXAMPLE 2

A primer composition was prepared using a comparable SEBS composition free of epoxysilane. The test data are also shown in Table 1.

TABLE 1

| Components | | Examples | | | | | | Comparative Examples | |
|---|---|---|---|---|---|---|---|---|---|
| | | 1 | 2 | 3 | 4 | 5 | 6 | 1 | 2 |
| SEBS (maleic anhydride-modified) | | | | | | | | | |
| Tuftec | M-1913[1] | 100 | 100 | 100 | 100 | | | | 100 |
| | M-1911[2] | | | | | 100 | | | |
| Kraton | FG 1901X[3] | | | | | | 100 | | |
| Epoxysilane: | | | | | | | | | |
| KBM 303[4] | | 8 | 16 | | | | | | |
| KBM 403[5] | | | | 8 | 16 | 5 | 5 | | |
| DBU (catalyst)[6] | | 1 | 1 | 1 | 1 | 1 | 1 | | |
| Hardlen 15L[7] | | | | | | | | 100 | |
| Toluene | | 900 | 900 | 900 | 900 | 900 | 900 | 200 | 900 |
| Adhesion Test | Initial peeling strength | 2.4 | 2.3 | 2.5 | 2.1 | 2.1 | 2.6 | 1.8 | 1.4 |
| | Dry peeling strength | 4.8 | 4.3 | 3.8 | 3.6 | 4.1 | 4.0 | 1.0 | 1.2 |
| | Peeling strength after heat aging | 3.6 | 3.9 | 3.2 | 3.5 | 4.0 | 3.8 | 0.1 | 0.1 |
| | Peeling strength after humidity aging | 3.3 | 3.6 | 3.2 | 3.5 | 3.6 | 3.7 | 0.1 | 0.1 |
| | Creep at high temperature | 0 | 0 | 0 | 0 | 0 | 0 | >75 | >75 |

Notes to Table 1
[1] Manufactured by Asahi Chemical Industry Co., Ltd.
[2] Manufactured by Asahi Chemical Industry Co., Ltd.
[3] Manufactured by Shell Chemical Company.
[4] $\gamma$-Glycidoxypropyltrimethoxysilane (Shin-Etsu Chemical Co., Ltd.)
[5] $\beta$-(3,4-Epoxycyclohexyl)ethyltrimethoxysilane
[6] 1,8-Diazabicyclo(5,4,0)undecane
[7] Manufactured by Toyo Soda Co., Ltd.

We claim:

1. A moisture-crosslinkable primer composition comprising a reaction product obtained by reacting a maleic anhydride-modified styrene-ethylene/butene-styrene copolymer with an epoxysilane compound, the anhydride moiety of the copolymer reacting with the glycidyl group of the epoxysilane.

2. The moisture-crosslinkable primer composition of claim 1 wherein said epoxysilane compound is selected from the group consisting of $\gamma$-glycidoxypropyldimethylethoxysilane, $\gamma$-glycidoxypropylmethyldiethoxysilane, $\gamma$-glycidoxypropyltrimethoxysilane, $\beta$-(3,4-epoxycyclohexyl)ethyltrimethoxysilane and $\beta$-(3,4-epoxycyclohexyl)ethylmethyldimethoxysilane.

3. The moisture-crosslinkable primer composition of claim 1 wherein said epoxysilane compound is reacted with the modified copolymer in a ratio of one-half to two equivalents based on the maleic anhydride in the modified copolymer.

* * * * *